United States Patent [19]

Müller

[11] Patent Number: 5,410,041

[45] Date of Patent: Apr. 25, 1995

[54] BISREACTIVE DYES HAVING A DISULFOPHENYLENE BRIDGING MEMBER

[75] Inventor: Bernhard Müller, Efringen-Kirchen, Germany

[73] Assignee: Ciba Geigy Corporation, Ardsley, N.Y.

[21] Appl. No.: 107,475

[22] Filed: Aug. 13, 1993

[30] Foreign Application Priority Data

Aug. 19, 1992 [CH] Switzerland .................. 2587/92

[51] Int. Cl.⁶ .............. C09B 62/04; C09B 62/06; C09B 62/10; D06P 1/382
[52] U.S. Cl. .................. 540/126; 534/618; 534/634; 544/76; 544/189
[58] Field of Search .......... 534/634, 618; 540/126; 544/76, 189

[56] References Cited

U.S. PATENT DOCUMENTS

| | | | |
|---|---|---|---|
| 3,646,002 | 2/1972 | Andrew | 534/624 |
| 3,647,778 | 3/1972 | Andrew | 534/634 |
| 3,926,944 | 12/1975 | Berrie et al. | 534/634 |
| 4,584,367 | 4/1986 | Matsuo et al. | 534/634 |
| 4,762,916 | 8/1988 | Schlafer | 534/631 |
| 4,973,671 | 11/1990 | Pandl et al. | 534/618 |
| 5,041,540 | 8/1991 | Pandl et al. | 534/618 |
| 5,232,462 | 8/1993 | Tzikas | 8/549 |
| 5,245,020 | 9/1993 | Jessen et al. | 534/634 X |

FOREIGN PATENT DOCUMENTS

| | | |
|---|---|---|
| 0126265 | 11/1984 | European Pat. Off. . |
| 0235521 | 9/1987 | European Pat. Off. . |
| 0315045 | 5/1989 | European Pat. Off. . |
| 0372315 | 6/1990 | European Pat. Off. . |
| 0458743 | 11/1991 | European Pat. Off. . |
| 0478503 | 4/1992 | European Pat. Off. . |
| 2334724 | 8/1977 | France . |
| 621358 | 1/1981 | Germany . |
| 148784 | 6/1981 | Germany . |
| 148785 | 6/1981 | Germany . |
| 634094 | 1/1983 | Germany . |
| 3601722 | 7/1987 | Germany . |
| 1271226 | 4/1972 | United Kingdom . |
| 1389053 | 4/1975 | United Kingdom . |
| 1461125 | 1/1977 | United Kingdom . |
| 1502998 | 3/1978 | United Kingdom . |
| 2008144 | 5/1979 | United Kingdom . |
| 1547659 | 6/1979 | United Kingdom . |
| 2106126 | 4/1983 | United Kingdom . |
| 2148921 | 6/1985 | United Kingdom . |

*Primary Examiner*—Mary C. Lee
*Assistant Examiner*—Fiona T. Powers
*Attorney, Agent, or Firm*—Kevin T. Mansfield

[57] ABSTRACT

The invention relates to fibre-reactive dyes of formula

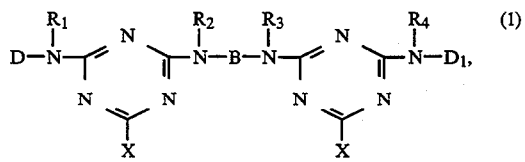

wherein the variables are as defined in the claims. These dyes are especially suitable for dyeing cellulosic fibre materials and produce dyeings of good tinctorial strength and good fastness properties.

6 Claims, No Drawings

BISREACTIVE DYES HAVING A DISULFOPHENYLENE BRIDGING MEMBER

The present invention relates to fibre-reactive dyes, to their preparation and to the use thereof for dyeing cellulosic fibre materials from an aqueous bath or for printing cellulosic fibre materials.

Specifically, the invention relates to reactive dyes of formula

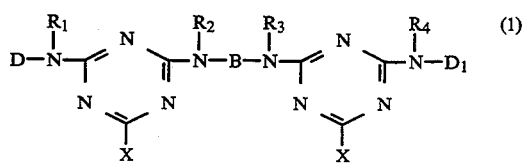

wherein B is a radical of formula

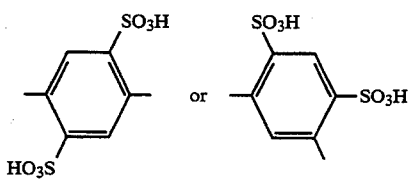

$R_1$, $R_2$, $R_3$ and $R_4$ are each independently of one another hydrogen, unsubstituted $C_1$-$C_4$alkyl or $C_1$-$C_4$alkyl which is substituted by halogen, hydroxy, cyano, $C_1$-$C_4$alkoxy, $C_1$-$C_4$alkoxycarbonyl, carboxy, sulfamoyl, sulfo or sulfato, and (I) X is chloro and D and $D_1$ are each independently of the other (Ia) the radical of a dioxazine dye,
(Ib) the radical of a phthalocyanine dye,
(Ic) the radical of an anthraquinone dye,
(Id) the radical of a formazan dye of formula

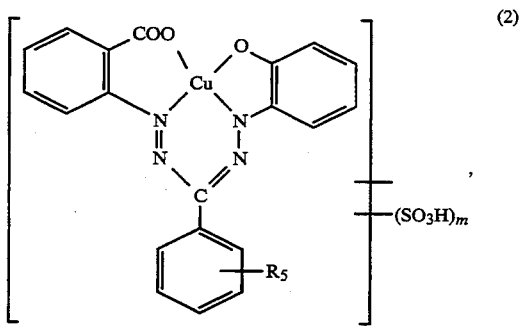

wherein $R_5$ is hydrogen, $C_1$-$C_4$alkyl, $C_1$-$C_4$alkoxy, halogen, nitro or cyano, and m is 1, 2 or 3, (Ie) the radical of a disazo dye of formula $$A_1-N=N-M-N=N-A_2- \quad (3),$$

wherein $A_1$, $A_2$ and M are each independently of one another a radical of the benzene or naphthalene series, (If) a radical of formula

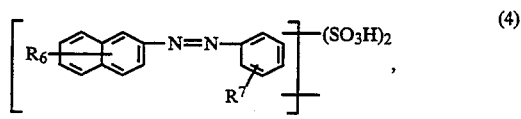

wherein $R_6$ and $R_7$ are each independently of the other hydrogen, $C_1$-$C_4$alkyl, $C_1$-$C_4$alkoxy, halogen, hydroxy or ureido, (Ig) a radical of formula

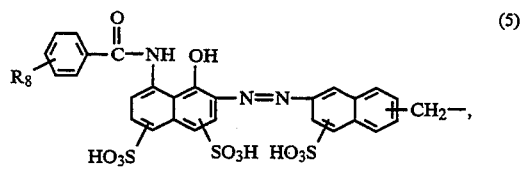

wherein $R_8$ is hydrogen, $C_1$-$C_4$alkyl, $C_1$-$C_4$alkoxy, halogen, hydroxy or ureido, or (Ih) a radical of formula

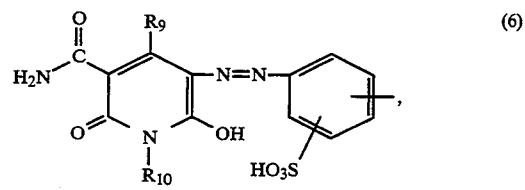

wherein $R_9$ and $R_{10}$ are each independently of the other hydrogen or $C_1$-$C_4$alkyl, or (II) X is fluoro and D and $D_1$ are each independently of the other (IIa) a radical of formula

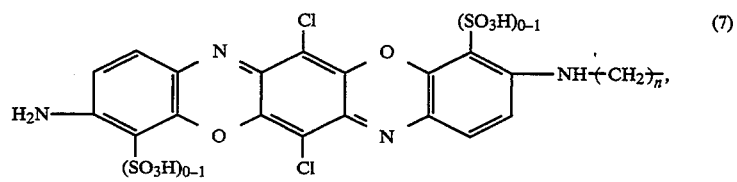

wherein n is 2, 3 or 4, (IIb) a radical of formula

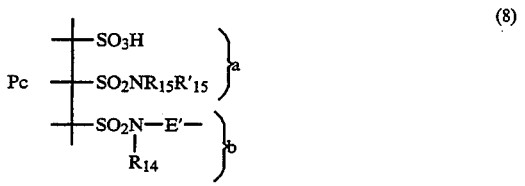

or

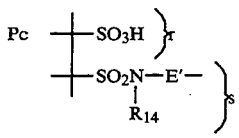

(8a)

wherein Pc is the radical of a copper or nickel phthalocyanine, $R_{14}$ is hydrogen or alkyl of 1 to 4 carbon atoms, $R_{15}$ and $R'_{15}$ are each independently of the other hydrogen or $C_1$-$C_4$alkyl which may be substituted by hydroxy or sulfo and/or interrupted by N or O, E' is a phenylene radical which may be substituted by alkyl of 1 to 4 carbon atoms, halogen, carboxy and/or sulfo, or is an alkylene radical of 2 to 6 carbon atoms, a and b are each an integer from 1.5 to 2.5 and the sum of (a+b) is 4, and r and s are each an integer from 1 to 3 and the sum of (r+s) is 2 to 4, (IIc) a radical of formula

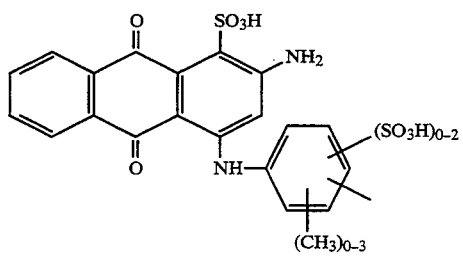

(9) or
(IId) a radical of formula

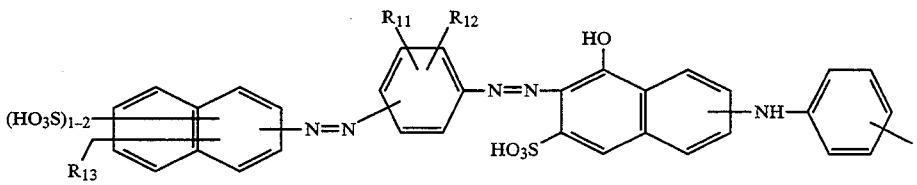

(10)

wherein $R_{11}$ and $R_{12}$ are each independently of the other hydrogen, halogen, sulfamoyl, carbamoyl, $C_1$-$C_4$alkyl, $C_1$-$C_4$alkoxy, acetylamino, hydroxyacetylamino, propionylamino, ureido, hydroxy, sulfomethyl or sulfo, and $R_{13}$ is hydrogen, hydroxy or amino.

Preferred compounds are those of formula

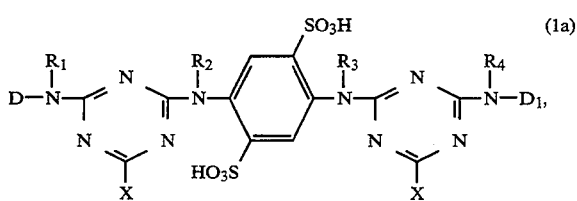

(Ia)

wherein D, $D_1$, $R_1$, $R_2$, $R_3$, $R_4$ and X are each as defined above.

$R_1$, $R_2$, $R_3$, $R_4$ or other substituents defined as $C_1$-$C_4$alkyl are methyl, ethyl, n-propyl or isopropyl or n-butyl, isobutyl, sec-butyl or tert-butyl. $C_1$-$C_4$Alkyl may be substituted, typically by halogen, which will generally be taken to mean e.g. bromo, fluoro or, preferably, chloro; hydroxy; cyano; $C_1$-$C_4$alkoxy, which may generally be exemplified by methoxy, ethoxy, n-propoxy or isopropoxy and n-butoxy, isobutoxy, sec- or tert-butoxy; $C_1$-$C_4$alkoxycarbonyl, typically methoxy- or ethoxycarbonyl; carboxy; sulfamoyl; sulfo; or sulfato.

Exemplary of suitable alkyl radicals $R_1$, $R_2$, $R_3$ and $R_4$ are any unsubstituted $C_1$-$C_4$alkyl radical, carboxymethyl, β-carboxyethyl, β-carboxypropyl, methoxycarbonylmethyl, ethoxycarbonylethyl, β-methoxyethyl, β-ethoxyethyl, β-methoxypropyl, β-chloroethyl, β-hydroxyethyl, β-hydroxybutyl, β-cyanoethyl, sulfomethyl, β-sulfoethyl, β-sulfatoethyl and χ-bromopropyl.

$R_1$, $R_2$, $R_3$ and $R_4$ are preferably each independently of one another hydrogen or $C_1$-$C_4$alkyl, more particularly hydrogen, methyl or ethyl and, most preferably, hydrogen.

D and/or $D_1$ as the radical of a dioxazine dye in (Ia) may typically have the formula

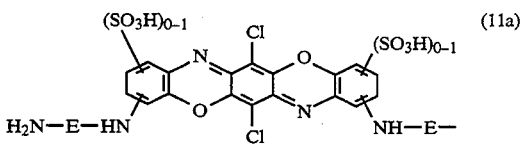

or

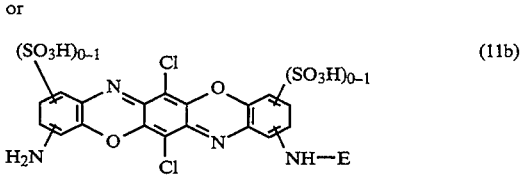

wherein E is a phenylene radical which may be substituted by alkyl of 1 to 4 carbon atoms, halogen, carboxy and/or sulfo; or an alkylene radical of 2 to 6 carbon atoms, including typically ethylene, 1-methyl-1,2-ethylene, 1,3-propylene or straight-chain or branched butylene, pentylene or hexylene; and the outer benzene rings in formulae (11a) and (11b) may be further substituted by alkyl of 1 to 4 carbon atoms, alkoxy of 1 to 4 carbon atoms, acetylamino, nitro, halogen, carboxy, sulfo or $-SO_2-Z$, and Z is β-sulfatoethyl, β-thiosulfatoethyl, β-phosphatoethyl, β-acetoxyethyl, β-haloethyl or vinyl.

D and/or $D_1$ as the radical of a phthalocyanine dye in (Ib) may have the formula

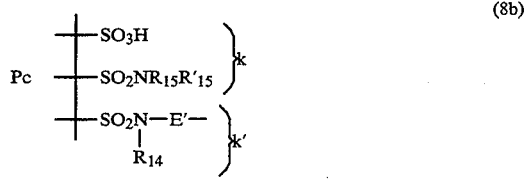

(8b)

wherein Pc, $R_{15}$ $R'_{15}$ and E' are each as previously defined and k=1-3 and k'=1-2, and the sum of (k+k') is 2-4.

Preferred phthalocyanine radicals D and $D_1$ are those of formula (8b), wherein k and k' are each as previously defined, Pc is the radical of a copper phthalocyanine, $R_{14}$ is methyl, ethyl or, preferably, hydrogen, $R_{15}$ and $R'_{15}$ are each independently of the other hydrogen or $C_1$-$C_4$alkyl, preferably hydrogen, and E' is $C_2$-$C_4$alkylene or unsubstituted or sulfo-substituted 1,3-or 1,4-phenylene, preferably ethylene, 1,3-phenylene, 1,4-phenylene or sulfophenylene.

D and/or $D_1$ as the radical of an anthraquinone in (Ic) is typically a radical of formula

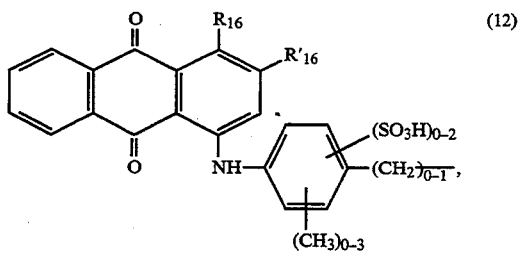

wherein one of $R_{16}$ and $R'_{16}$ is amino and the other is sulfo.

$R_5$ in formula (2) is preferably methyl, ethyl, chloro, cyano or, preferably, hydrogen.

m in formula (2) is preferably 1 or, most preferably, 2.

The substituents $A_1$ and $A_2$ in formula (3) are each independently of the other a phenyl or 1- or 2-naphthyl radical which is unsubstituted or substituted by sulfo, carboxy, ureido, amino, $C_2$-$C_4$alkanoylamino, typically acetylamino or n-propylamino, benzoylamino, halogen, $C_1$-$C_4$alkyl, $C_1$-$C_4$alkoxy, hydroxy or a radical —$SO_2Z$, wherein Z is as previously defined. $A_1$ and $A_2$ are preferably each independently of the other a phenyl or 1- or 2-naphthyl radical which is substituted by sulfo, hydroxy, ureido, methyl, methoxy and/or acetylamino.

The middle component M is suitably a 1,3- or 1,4-phenylene radical or a 1,4-naphthylene radical, which bivalent aromatic radicals may each be unsubstituted or substituted by sulfo, carboxy, ureido, amino, $C_2$-$C_4$alkanoylamino, benzoylamino, halogen, $C_1$-$C_4$alkyl, $C_1$-$C_4$alkoxy or hydroxy. M is preferably a 1,4-phenylene or 1,4-naphthylene radical which is unsubstituted or substituted by sulfo, methyl, methoxy and/or acetylamino.

M, $A_1$ and $A_2$ together carry preferably 2 to 4 and, most preferably, 2 or 3 sulfo groups.

$R_6$ and $R_7$ are each independently of the other preferably hydrogen, hydroxy, methyl, methoxy or ureido.

$R_8$ is preferably methyl, methoxy, chloro, hydroxy or, most preferably, hydrogen.

$R_9$ and $R_{10}$ are each independently of the other preferably methyl or ethyl. The most preferred meaning of $R_9$ is methyl and that of $R_{10}$ is ethyl.

$R_{11}$ and $R_{12}$ are each independently of the other preferably hydrogen, methyl, methoxy, hydroxy or sulfo.

D and $D_1$ may be different or, preferably, identical.

A preferred embodiment of the invention relates to compounds of previously indicated formula (1), wherein X is chloro and D and $D_1$ are each a radical (Ia)-(Ih).

Especially preferred are compounds of formula (1a), wherein X is chloro, $R_1$, $R_2$, $R_3$ and $R_4$ are each independently of one another hydrogen, methyl or ethyl, and D and $D_1$ are each independently of the other (Ia) the radical of a dioxazine dye,
(Ib) the radical of a phthalocyanine dye,
(Ic) the radical of an anthraquinone dye, or
(Ih) a radical of formula

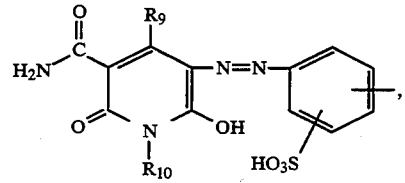

wherein $R_9$ and $R_{10}$ are each independently of the other hydrogen or $C_1$-$C_4$alkyl.

Especially preferred are compounds of formula (1a), wherein X is chloro, $R_1$, $R_2$, $R_3$ and $R_4$ are each independently of one another hydrogen, methyl or ethyl, and D and $D_1$ are each a radical of formula (6), (8b), (11a), (11b) or (12) as previously indicated above. Among this group of compounds, those compounds of formula (1) are preferred wherein X is chloro and D and $D_1$ are each a radical of formula (8b), (11a) or (11b).

Further preferred compounds of formula (1) are those wherein X is fluoro and D and $D_1$ are each a radical of formula (7), (8), (8a) or (9) previously indicated above.

A particularly preferred embodiment of this invention relates to compounds of formula (1a), wherein $R_1$, $R_2$, $R_3$ and $R_4$ are each independently of one another hydrogen, methyl or ethyl, and (I) X is chloro and D and $D_1$ are each a radical of formula

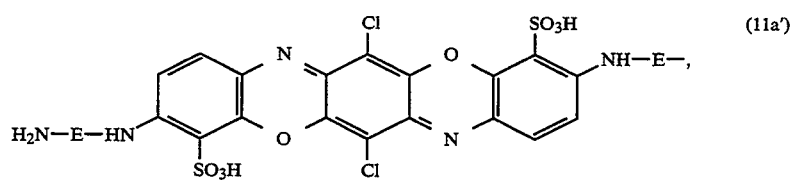

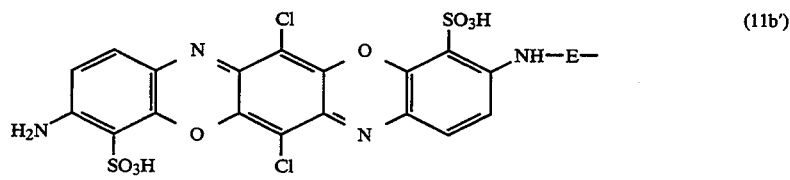

or

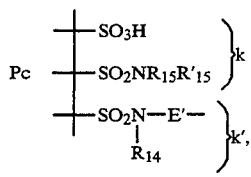

wherein E is an alkylene radical of 2 to 4 carbon atoms, preferably ethylene or 1,3-propylene, Pc is the radical of a copper phthalocyanine, $R_{14}$, $R_{15}$ and $R'_{15}$ are each independently of one another methyl, ethyl or, preferably, hydrogen, E' is ethylene, 1,3-phenylene, 1,4-phenylene or sulfophenylene, and k and k' are each as previously defined, or (II) X is fluoro and D and $D_1$ are each a radical of formula

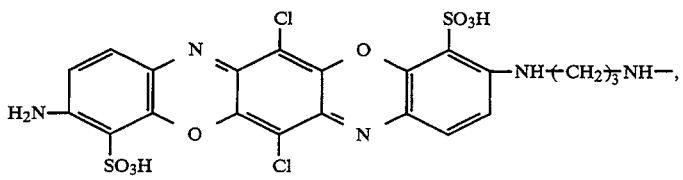

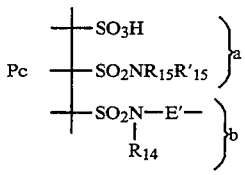

or

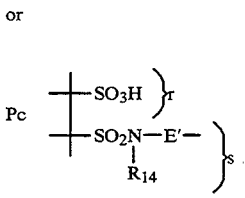

wherein Pc is the radical of a copper phthalocyanine, $R_{14}$, $R_{15}$ and $R'_{15}$ are each independently of one another methyl, ethyl or, preferably, hydrogen, E' is ethylene, 1,3-phenylene, 1,4-phenylene or sulfophenylene, a and b are each an integer from 1.5 to 2.5 and the sum of (a+b) is 4, and r and s are each an integer from 1 to 3 and the sum of (r+s) is 2 to 4.

The compounds of formula (1) are fibre-reactive. By fibre-reactive compounds are meant those that are able to react with the hydroxyl groups of cellulose, the amino, carboxyl, hydroxyl and thiol groups of wool and silk, or with the amino and carboxyl groups of synthetic polyamides to form covalent chemical bonds.

The compounds of formula (1) contain at least two and, preferably, four to eight sulfo groups, and are in the from of the free acid or, preferably, in salt form, e.g. as sodium, lithium, potassium or ammonium salt. Compounds of formula (1) may also be obtained as mixed salt, conveniently as sodium/lithium or sodium/lithium/ammonium salt.

The compounds of formula (1) can be prepared in general accordance with the process described in EP-A 0 478 503, by reacting about 1 equivalent of an organic dye of formula D—$NHR_1$ (7a)

or a dye precursor, about 1 equivalent of an organic dye of formula

D—$NHR_4$ (8)

or a dye precursor, about 2 equivalents of 2,4,6-trifluoro-s-triazine (cyanuric fluoride) or 2,4,6-trichloro-s-triazine (cyanuric chloride) and about 1 equivalent of a diamine of formula

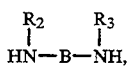

(8a)

wherein B, D, $D_1$, $R_1$, $R_2$, $R_3$ and $R_4$ are each as previously defined, in any order with each other or, if dye precursors are used, convening the intermediates so obtained into the desired dyes and, if desired, carrying out a further conversion reaction.

The preparation of the final dyes from precursors are preferably coupling reactions resulting in azo dyes.

As the order in which the above described individual process steps are carried out may differ and also in some cases may be carried out simultaneously, different variants of the process are possible. Normally the reaction is carried out stepwise, the order of the simple reactions conveniently being in accordance with the special conditions.

Which of the possible process variants gives the best results or under which special conditions, e.g. at which condensation temperature, the reaction shall best be carried out, will depend on the structure of the starting materials. As hydrolysis of a halotriazinyl radical will occur under specific conditions, an intermediate which contains acetylamino groups must be saponified to remove the acetyl groups before condensation with a halotriazine. Which reaction during the synthesis of a secondary condensate of a diamine, triazine and dye D—$NHR_1$ or $D_1$—$NHR_4$ is best carried out first, viz. that of the triazine with the dye or the diamine, differs from case to case and depends in particular on the solubility of the amino compounds employed and the basicity of the amino groups to be acylated.

The invention further relates to a process for dyeing and printing cellulosic fibre materials with the dyes of formula (1). Suitable fibre materials typically include natural cellulose fibres such as cotton, linen and hemp, as well as viscose staple fibre and regenerated cellulose. The dyes are also suitable for dyeing or printing hydroxyl group containing fibres contained in blended fabrics, typically blends of cotton with polyamide fibres or, preferably, polyester fibres.

The dyes used in the practice of this invention can be applied in different manner to the fibre material and fixed thereon, preferably in the form of aqueous dye solutions and print pastes. They are suitable for the exhaust process as well as for dyeing by the pad process in which the goods are impregnated with aqueous dye solutions which may contain salts, and the dyes are fixed after a treatment with alkali or in the presence of alkali, with or without the application of heat. After fixation, the dyeings or prints are thoroughly washed with cold and hot water, with the optional addition of a compound that acts as a dispersant and promotes the diffusion of unfixed dye. The standard dyeing and printing processes are used for dyeing and printing.

The dyes are distinguished by good fixation and very good build-up. They can be applied by the exhaust process over a very wide temperature range and are therefore also very suitable for dyeing cotton/polyester blends under the conditions recommended for such fabrics. Fixation is good and the difference between the degree of exhaustion and dye fixation is remarkably small, i.e. the soap loss is very minor. Readily reproducible, level dyeings are obtained. The dyes of formula (1) are also suitable for printing, especially on cotton, and also for printing nitrogen-containing fibres, typically wool or silk or blends containing wool or silk.

The dyeings and prints obtained on cellulosic fibre materials with the dyes used in the practice of this invention have good tinctorial strength and an excellent fibre-dye bonding stability in the acidic as well as in the alkaline range, and also good lightfastness and very good wetfastness properties such as fastness to washing, water, sea-water, cross-dyeing and perspiration, as well as good fastness to pleating, ironing and rubbing and very good fastness to chlorinated water.

The dyes of formula (1) are obtained either in the form of the free sulfonic acid or, preferably, of their salts, such as the alkali metal, alkaline earth metal or ammonium salts or salts of an organic amine. Exemplary of such salts are the sodium, lithium or ammonium salts or the salt of triethanolamine.

The invention is illustrated by the following Examples in which parts and percentages, unless otherwise stated, are by weight.

EXAMPLE 1

442.3 parts of 2,4,6-trichloro-1,3,5-triazine, 4 parts of a wetting agent and 10 parts of disodium phosphate are suspended in 2500 parts of ice/water. A neutral solution of 268.3 parts of 2,5-diamino-1,4-benzenedisulfonic acid in 2500 parts of water is added dropwise such that the temperature does not exceed 5° C., while keeping the pH constant at c. 3.0 by addition of sodium hydroxide solution. The suspension containing 2,5-bis[(4,6-dichloro-1,3,5-triazin-2-yl)amino]benzene-1,4-disulfonic acid is neutralised and further processed direct.

EXAMPLE 2

405.3 parts of 2,4,6-trifluoro-1,3,5-triazine are added dropwise to a neutral solution of 268.3 parts of 2,5-diaminobenzene-1,4-disulfonic acid in 2500 parts of water such that the temperature does not rise above 2° C., while keeping the pH constant at c. 5.0 by the addition of sodium hydroxide solution. The suspension containing 2,5-bis[(4,6-difluoro-1,3,5-triazin-2-yl)amino]benzene-1,4-disulfonic acid is neutralised and further processed direct.

EXAMPLE 3

The suspension of 2,5-bis[(4,6-dichloro-1,3,5-triazin-2-yl)amino]benzene-1,4-disulfonic acid obtained according to Example 1 is added dropwise to a neutral solution of 846.8 parts of 7-amino-4-hydroxy-3-(2-sulfophenylazo)naphthalene-2-sulfonic acid in water, while keeping the pH constant at 7.0 by the simultaneous addition of sodium hydroxide solution. The reaction mixture is warmed to room temperature and, upon completion of the reaction, the dye of formula

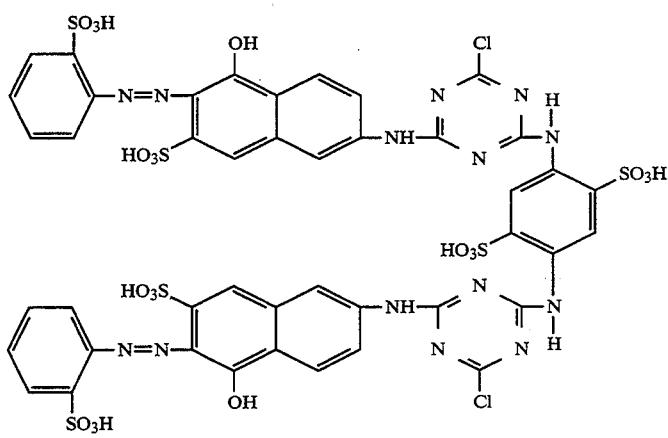

is salted out, washed and dried.

is isolated by evaporative concentration.

EXAMPLE 4

The suspension of 2,5-bis[(4,6-dichloro-1,3,5-triazin-2-yl)amino]benzene-1,4-disulfonic acid obtained according to Example 1 is added dropwise to a neutral suspension of 1194 parts of the copper complex of 5-amino-3-(3-phenyl-5-(2-carboxy-5-sulfophenyl)-1-formazano)-4-hydroxybenzenesulfonic acid in 6000 parts of water, while keeping the pH constant at 7.0 by the simultaneous addition of sodium hydroxide solution. The reaction mixture is allowed to warm to room temperature, the dye solution is freed from salt by dialysis and the dye of formula

EXAMPLE 5

The suspension of 2,5-bis[(4,6-dichloro-1,3,5-triazin-2-yl)amino]benzene-1,4-disulfonic acid obtained according to Example 1 is added dropwise to 1204.8 parts of 10-amino-3-(3-aminopropylamino)-6,13-dichloro-4,11-triphendioxazindisulfonic acid, dissolved in 9500 parts of water with lithium hydroxide at pH 9.5, while keeping the pH constant at 9.5 by the simultaneous addition of sodium hydroxide solution. The reaction mixture is allowed to warm to room temperature, the dye solution is freed from salt by dialysis and the dye of formula

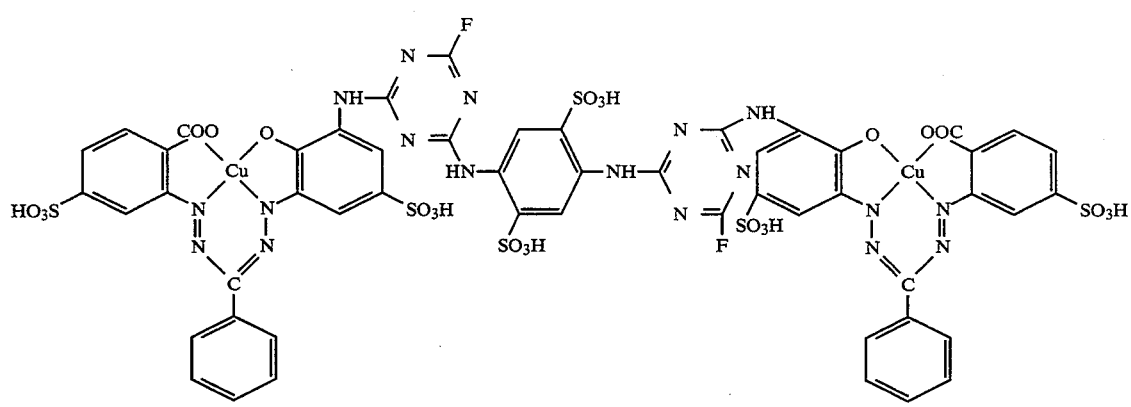

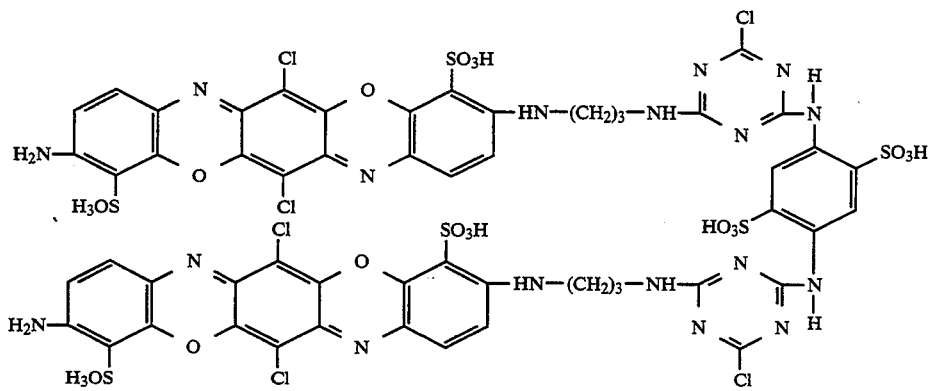
is isolated by evaporative concentration.
EXAMPLE 6-20
The procedures of Examples 3 to 5 are carried out, replacing the chromophores used therein with those listed in the following table to give analogous dyes.
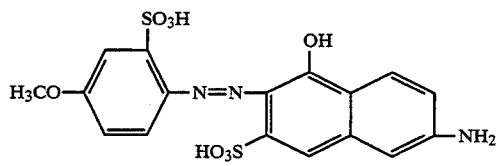  6
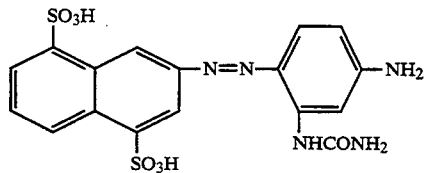  7
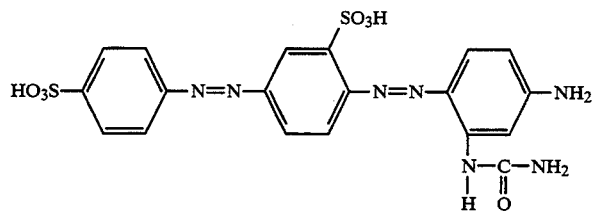  8
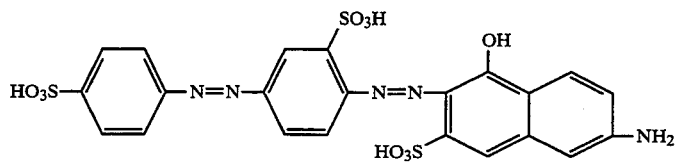  9
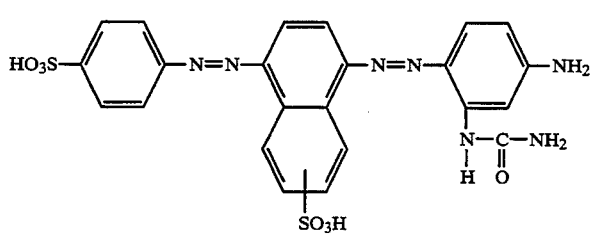  10

-continued
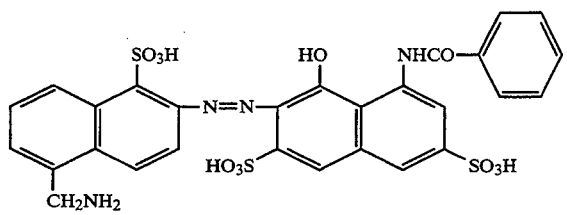
11
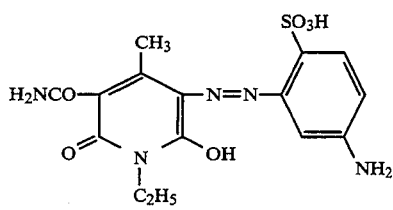
12
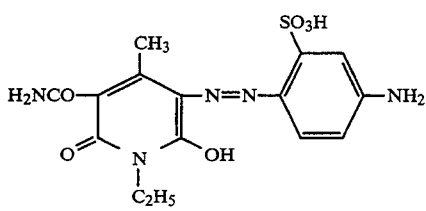
13
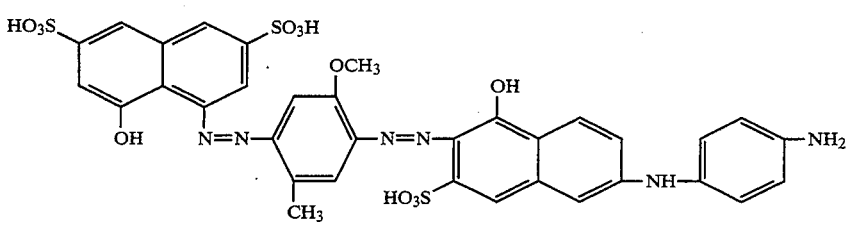
14
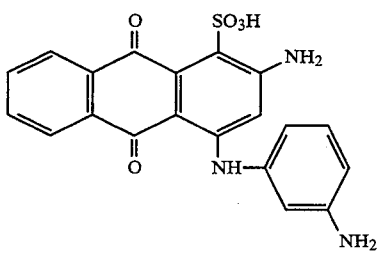
15
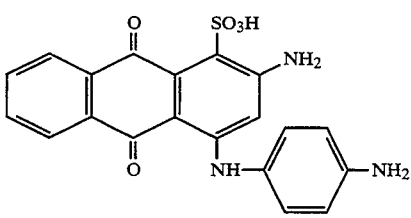
16
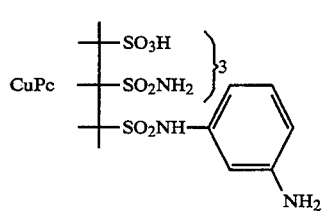
17

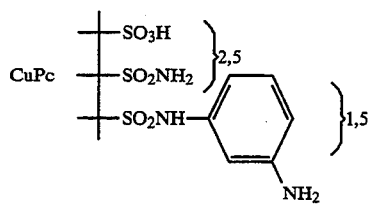

18

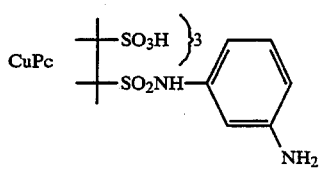

19

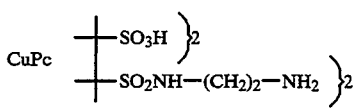

20

EXAMPLES 21–25

The procedures of Examples 3 to 5 are repeated, replacing the suspension of 2,5-bis[(4,6-dichloro-1,3,5-triazin-2-yl)amino]benzene-1,4-disulfonic acid obtained according to Example 1 with the suspension containing 2,5-bis[(4,6-difluoro-1,3,5-triazin-2-yl)amino]benzene-1,4-disulfonic acid according to Example 2, and replacing the chromophores used therein with those of the following table, to give analogous fluorotriazinyl dyes.

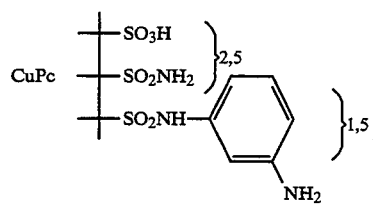

21

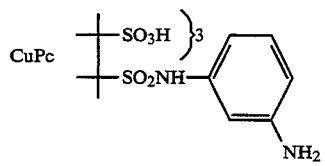

22

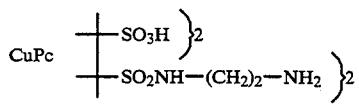

23

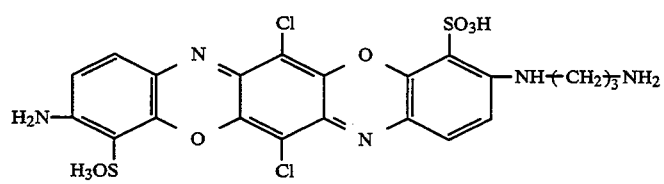

24

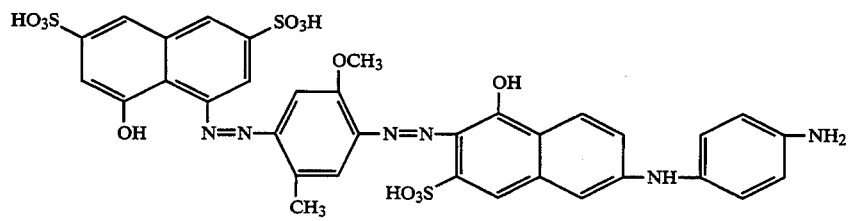

25

EXAMPLE 26

442.3 parts of 2,4,6-trichloro-1,3,5-triazine, 4 parts of a wetting agent and 10 parts of disodium phosphate are suspended in 2500 parts of ice/water. A neutral solution of 268.3 parts of 4,6-diamino-1,3-benzenedisulfonic acid in 2500 parts of water is added dropwise such that the temperature does not exceed 5° C., while keeping the pH constant at c. 6.5 by addition of sodium or lithium hydroxide solution. The suspension containing 4,6-bis[(4,6-dichloro-1,3,5-triazin-2-yl)amino]benzene-1,3-disulfonic acid is neutralised and further processed direct.

EXAMPLE 27

405.3 parts of 2,4,6-trifluoro-1,3,5-triazine are added dropwise to a neutral solution of 268.3 parts of 4,6-diaminobenzene-1,3-disulfonic acid in 2500 parts of water such that the temperature does not rise above 2° C., while keeping the pH constant at c. 5.0 by the addition of sodium or lithium hydroxide solution. The suspension containing 4,6-bis[(4,6-difluoro-1,3,5-triazin-2-yl)amino]benzene-1,3-disulfonic acid is neutralised and further processed direct.

EXAMPLE 28

The suspension containing 4,6-bis[(4,6-dichloro-1,3,5-triazin-2-yl)amino]-benzene-1,3-disulfonic acid obtained according to Example 26 is added dropwise to a neutral solution of 1063.1 parts of 1-amino-4-(3-amino-2,4,6-trimethyl-5-sulfophenyl)anthraquinone-2-sulfonic acid in water, while keeping the pH constant at c. 7.0 by the simultaneous addition of sodium hydroxide solution. The reaction mixture is allowed to warm to room temperature and, upon completion of the reaction, the dye of formula

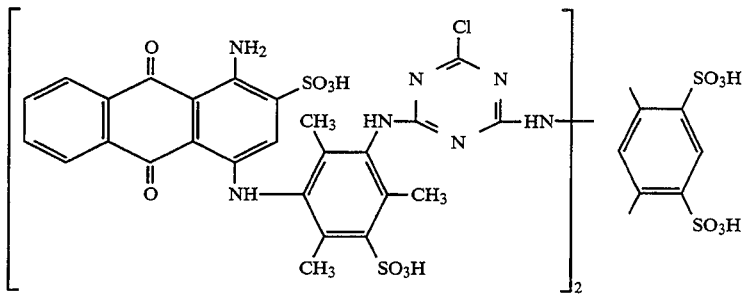

is salted out, washed and dried. It dyes cellulose in brilliant blue shades.

EXAMPLE 29

The suspension containing 4,6-bis[(4,6-dichloro-1,3,5-triazin-2-yl)amino]-benzene-1,3-disulfonic acid obtained according to Example 26 is added dropwise to a neutral solution of 750.8 parts of 1-amino-4-(3-aminopropyl)anthraquinone-2-sulfonic acid in water, while keeping the pH constant at 7.0 by the simultaneous addition of sodium hydroxide solution. The reaction mixture is allowed to warm to room temperature and, upon completion of the reaction, the dye of formula

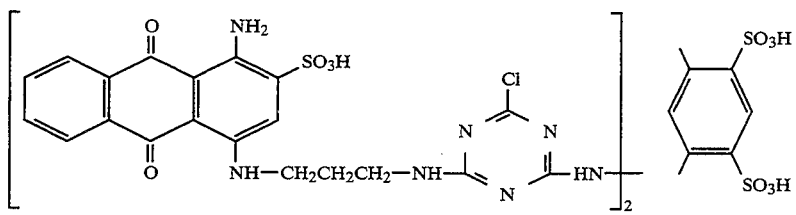

is salted out, washed and dried. It dyes cellulose in brilliant blue shades.

EXAMPLE 30

The suspension containing 4,6-bis[(4,6-dichloro-1,3,5-triazin-2-yl)amino]-benzene-1,3-disulfonic acid obtained according to Example 26 is added dropwise to a neutral solution of 1352.2 parts of the copper complex of 3-[5-(4-amino-2-carboxyphenyl)-3-(1-sulfophenyl-1-formazano]-2-hydroxy-1,5-benzenedisulfonic acid in water, while keeping the pH constant at 7.0 by the simultaneous addition of sodium or lithium hydroxide solution. The reaction mixture is allowed to warm to room temperature and, upon completion of the reaction, the dye of formula

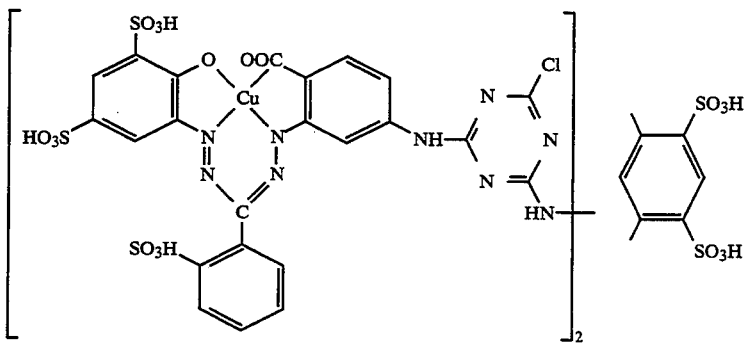

is salted out, washed and dried. It dyes cellulose in brilliant blue shades.

perature and, upon completion of the reaction, the dye of formula

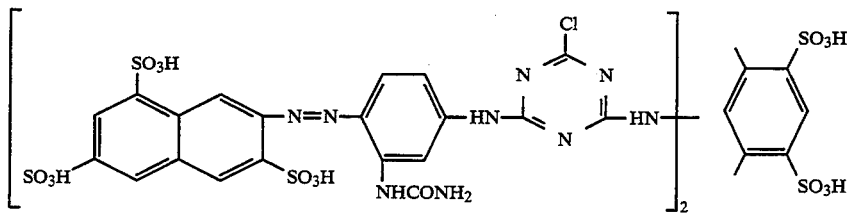

is salted out, washed and dried. It dyes cellulose in brilliant golden yellow shades.

EXAMPLE 31

The suspension containing 4,6-bis[(4,6-dichloro-1,3,5-triazin-2-yl)amino]benzene-1,3-disulfonic acid obtained according to Example 26 is added dropwise to a neutral solution of 1352.2 parts of the copper complex of 3-[5-(4-amino-2-carboxyphenyl)-3-(1-sulfophenyl-1-formazano]-2-hydroxy-1,5-benzenedisulfonic acid in water, while keeping the pH constant at 7.0 by the simultaneous addition of sodium or lithium hydroxide solution. The reaction mixture is allowed to warm to room tem-

EXAMPLES 32–35

The procedures of Examples 28–31 are carried out, replacing the suspension containing 4,6-bis[(4,6-dichloro-1,3,5-triazin-2-yl)amino]benzene-1,3-disulfonic acid obtained according to Example 26 with the suspension containing 4,6-bis[(4,6-difluoro-1,3,5-triazin-2-yl)amino]benzene-1,3-disulfonic acid according to Example 27, to give analogous fluorotriazinyl dyes.

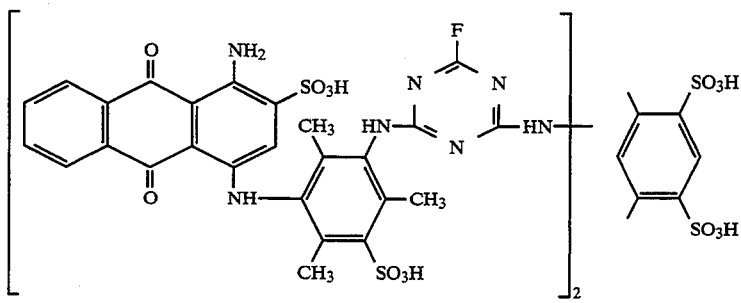

32

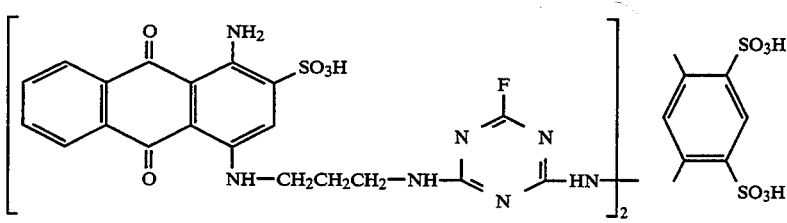

33

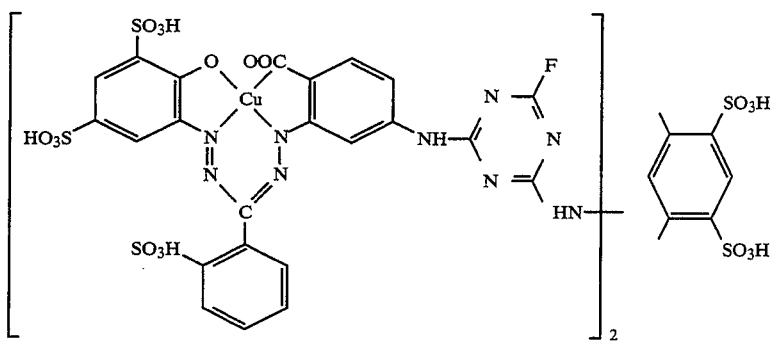

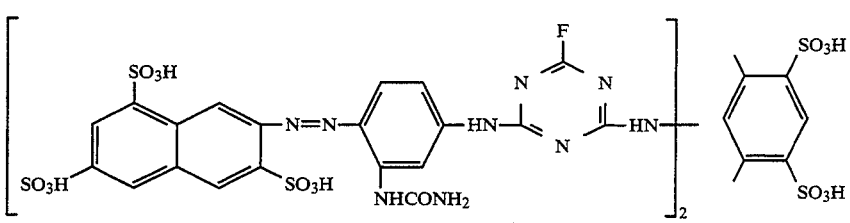

What is claimed is:

1. A reactive dye of the formula

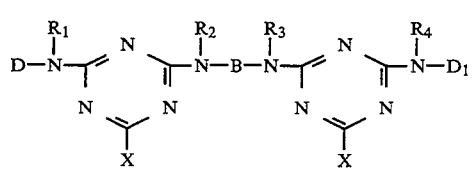 (1)

wherein B is a radical of the formula

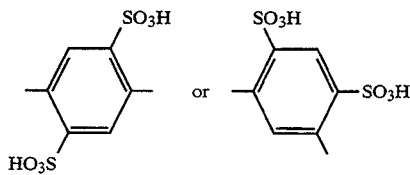

$R_1$, $R_2$, $R_3$ and $R_4$ are each independently of one another hydrogen, unsubstituted $C_1$–$C_4$alkyl or $C_1$–$C_4$alkyl which is substituted by halogen, hydroxy, cyano, $C_1$–$C_4$alkoxy, $C_1$–$C_4$alkoxycarbonyl, carboxy, sulfamoyl, sulfo or sulfato, X is chloro and D and $D_1$ are each independently of the other (Ia) the radical of a dioxazine dye,
(Ib) the radical of a phthalocyanine dye, or
(Ic) the radical of an anthraquinone dye.

2. A reactive dye of the formula

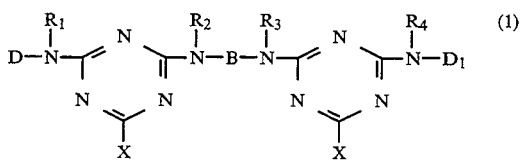 (1)

wherein B is a radical of the formula

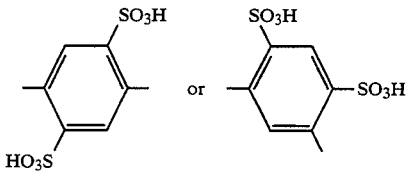

$R_1$, $R_2$, $R_3$ and $R_4$ are each independently of one another hydrogen, unsubstituted $C_1$–$C_4$alkyl or $C_1$–$C_4$alkyl which is substituted by halogen, hydroxy, cyano, $C_1$–$C_4$alkoxy, $C_1$–$C_4$alkoxycarbonyl, carboxy, sulfamoyl, sulfo or sulfato, X is fluoro and D and $D_1$ are each (IIa) a radical of the formula

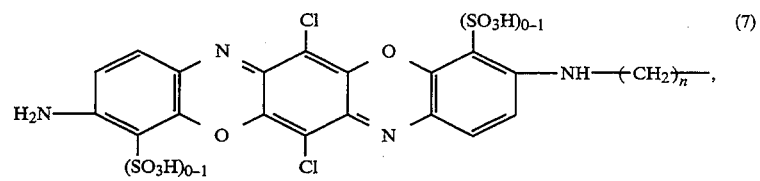 (7)

wherein n is 2, 3 or 4,
(IIb) a radical of the formula

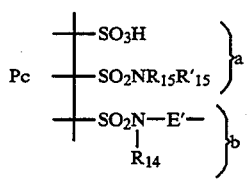
(8)

or

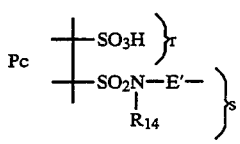
(8a)

wherein Pc is the radical of a copper or nickel phthalocyanine, $R_{14}$ is hydrogen or alkyl of 1 to 4 carbon atoms, $R_{15}$ and $R'_{15}$ are each independently of the other hydrogen or $C_1$–$C_4$alkyl which is unsubstituted or substituted by hydroxy or sulfo and/or interrupted by N or O, E' is a phenylene radical which is unsubstituted or substituted by alkyl of 1 to 4 carbon atoms, halogen, carboxy and/or sulfo, or is an alkylene radical of 2 to 6 carbon atoms, a and b are each from 1.5 to 2.5 and the sum of (a+b) is 4, and r and s are each an integer from 1 to 3 and the sum of (r+s) is 2 to 4, or (IIc) a radical of the formula

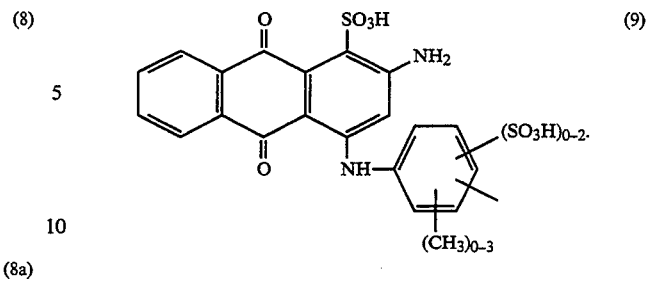
(9)

3. A reactive dye of the formula

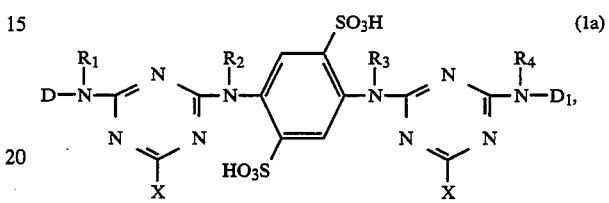
(1a)

wherein $R_1$, $R_2$, $R_3$ and $R_4$ are each independently of one another hydrogen, methyl or ethyl, and (I) X is chloro and D and $D_1$ are each a radical of the formula

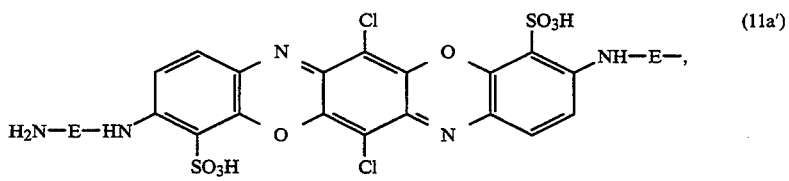
(11a')

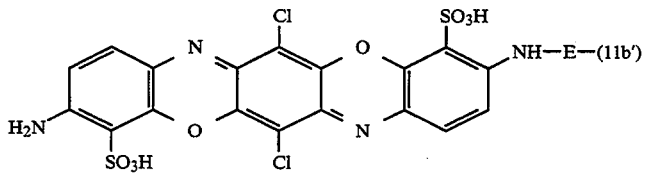
(11b')

or

(8b)

wherein E is an alkylene radical of 2 to 4 carbon atoms, Pc is the radical of a copper phthalocyanine, $R_{14}$, $R_{15}$ and $R'_{15}$ are each independently of one another methyl, ethyl or hydrogen, E' is ethylene, 1,3-phenylene, 1,4-phenylene or sulfophenylene, and k=1–3 and k'=1–2, or (II) X is fluoro and D and $D_1$ are each a radical of the formula

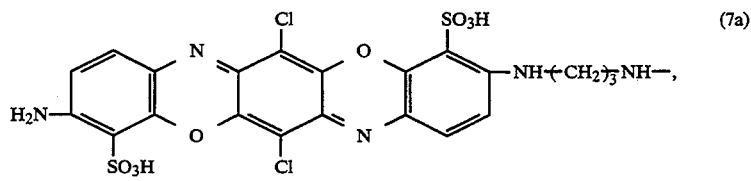
(7a)

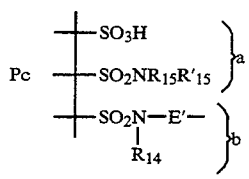
(8)

or

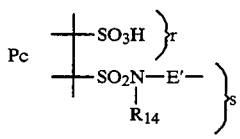
(8a)

wherein Pc is the radical of a copper phthalocyanine, $R_{14}$, $R_{15}$ and $R'_{15}$ are each independently of one another methyl, ethyl or hydrogen, E' is ethylene, 1,3-phenylene, 1,4-phenylene or sulfophenylene, a and b are each 1.5 to 2.5 and the sum of (a+b) is 4, and r and s are each an integer from 1 to 3 and the sum of (r+s) is 2 to 4.

4. A reactive dye according to claim 1, wherein X is chloro and D and/or $D_1$ are a dioxazine radical of formula

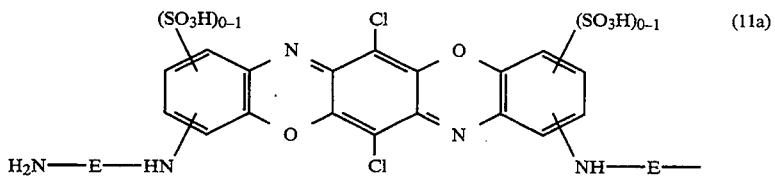
(11a)

or

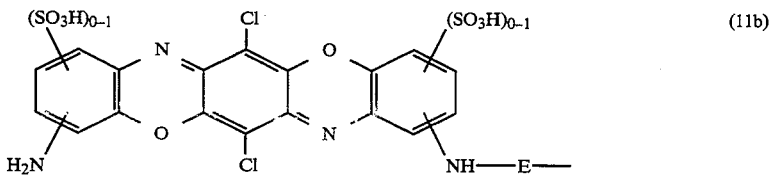
(11b)

wherein E is a phenylene radical which is unsubstituted or substituted by alkyl of 1 to 4 carbon atoms, halogen, carboxy and/or sulfo; or is an alkylene radical of 2 to 6 carbon atoms; the outer benzene rings are unsubstituted or further substituted by alkyl of 1 to 4 carbon atoms, alkoxy of 1 to 4 carbon atomes, acetylamino, nitro, halogen, carboxy, sulfo or —$SO_2$—Z, and Z is β-sulfatoethyl, β-thiosulfatoethyl, β-phosphatoethyl, β-acetoxyethyl, β-haloethyl or vinyl.

5. A reactive dye according to claim 1, wherein D and/or $D_1$ are a phthalocyanine radical of formula

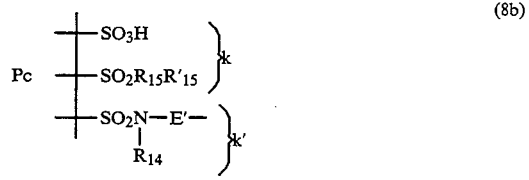
(8b)

wherein Pc is the radical of a copper phthalocyanine, $R_{14}$ is methyl, ethyl or hydrogen, $R_{15}$ and $R'_{15}$ are each independently of the other hydrogen or $C_1$-$C_4$alkyl, E' is $C_2$-$C_4$alkylene or unsubstituted or sulfo-substituted 1,3- or 1,4-phenylene, and k=1-3 and k'=1-2, and the sum of (k+k') is 2-4.

6. A reactive dye according to claim 1, wherein D and/or $D_1$ is the radical of an anthraquinone of formula

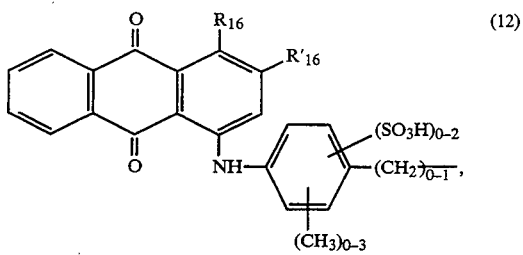
(12)

wherein one of $R_{16}$ and $R'_{16}$ is amino and the other is sulfo.

* * * * *